US009324337B2

(12) United States Patent
Brown

(10) Patent No.: US 9,324,337 B2
(45) Date of Patent: Apr. 26, 2016

(54) METHOD AND SYSTEM FOR DIALOG ENHANCEMENT

(75) Inventor: Charles Phillip Brown, Castro Valley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 932 days.

(21) Appl. No.: 12/945,967

(22) Filed: Nov. 15, 2010

(65) Prior Publication Data

US 2011/0119061 A1     May 19, 2011

Related U.S. Application Data

(60) Provisional application No. 61/262,019, filed on Nov. 17, 2009.

(51) Int. Cl.
*G10L 21/0216*     (2013.01)
*G10L 21/02*     (2013.01)
(Continued)

(52) U.S. Cl.
CPC ........... *G10L 21/0208* (2013.01); *G10L 19/008* (2013.01); *G10L 21/02* (2013.01);
(Continued)

(58) Field of Classification Search
USPC ...................... 704/200–200.1, 205–210, 211, 704/225–228, 231–231, 233, 246, 251, 704/255–257, 258, 270, 276, 278, 500–504, 704/E15.001–E15.05, E21.001–E21.019; 381/1, 23.1, 300–305, 310, 66, 381/312–331, 71.1–71.14, 92–94.9, 98–103
See application file for complete search history.

(56) References Cited

U.S. PATENT DOCUMENTS 3,678,416 A * 7/1972 Burwen .................... G11B 5/00
                                                                           327/553
3,753,159 A * 8/1973 Burwen ........................ 333/17.1
(Continued)

FOREIGN PATENT DOCUMENTS

WO         9009728        8/1990
WO     2010/083137      7/2010

OTHER PUBLICATIONS

"Chapter 8: Analog Filters." Basic Linear Design. ED: Zumbahlen, Hank. PUB: Analog Devices. 2007.*

*Primary Examiner* — Pierre-Louis Desir
*Assistant Examiner* — David Kovacek

(57) ABSTRACT

A method and system for enhancing dialog determined by an audio input signal. In some embodiments the input signal is a stereo signal, and the system includes an analysis subsystem configured to analyze the stereo signal to generate filter control values, and a filtering subsystem including upmixing circuitry configured to upmix the input signal to generate a speech channel and non-speech channels and a peaking filter configured to filter the speech channel to enhance dialog while being steered by at least one of the control values. The filtering subsystem also includes ducking circuitry for attenuating the non-speech channels while being steered by at least some of the control values, and downmixing circuitry configured to combine outputs of the peaking filter and ducking circuitry to generate a filtered stereo output. In some embodiments, the system is configured to downmix a multichannel input signal to generate a downmixed stereo signal, an analysis subsystem is configured to analyze the downmixed stereo signal to generate filter control values, and a filtering subsystem is configured to generate a dialog-enhanced audio signal in response to the input signal while being steered by at least some of the filter control values. Preferably, the filter control values are generated without use of feedback including by generating power ratios (for pairs of speech and non-speech channels) and preferably also shaping in nonlinear fashion and scaling at least one of the power ratios.

31 Claims, 6 Drawing Sheets

(51) Int. Cl.
  *G10L 21/0208* (2013.01)
  *G10L 19/008* (2013.01)
  *G10L 19/012* (2013.01)
  *G10L 19/028* (2013.01)
  *G10L 15/28* (2013.01)
  *G10L 21/0232* (2013.01)

(52) U.S. Cl.
  CPC ............. *G10L21/0216* (2013.01); *G10L 15/28* (2013.01); *G10L 19/012* (2013.01); *G10L 19/028* (2013.01); *G10L 21/0232* (2013.01)

(56) References Cited

U.S. PATENT DOCUMENTS

| | | | | |
|---|---|---|---|---|
| 4,539,526 A * | 9/1985 | Davis | ............................ | 330/144 |
| 4,586,174 A * | 4/1986 | Wong | ........................ | H04J 1/08 370/477 |
| 4,617,676 A * | 10/1986 | Jayant et al. | .................. | 704/212 |
| 4,627,098 A * | 12/1986 | Dolikian et al. | ................ | 455/70 |
| 4,628,529 A * | 12/1986 | Borth | .................. | G10L 21/0208 381/317 |
| 4,887,299 A * | 12/1989 | Cummins et al. | ............. | 381/317 |
| 4,893,347 A * | 1/1990 | Eastmond et al. | ............ | 455/506 |
| 5,065,451 A * | 11/1991 | Leveque | ................. | H04B 1/64 333/14 |
| 5,228,088 A * | 7/1993 | Kane et al. | .................... | 704/233 |
| 5,251,263 A * | 10/1993 | Andrea et al. | ............... | 381/71.6 |
| 5,303,042 A * | 4/1994 | Lewis et al. | ................ | 348/14.01 |
| 5,406,635 A * | 4/1995 | Jarvinen | ............ | G10L 21/0208 381/94.3 |
| 5,459,813 A | 10/1995 | Klayman | | |
| 5,553,192 A * | 9/1996 | Hayata | .......................... | 704/228 |
| 5,633,938 A * | 5/1997 | Porter, III | ....................... | 381/98 |
| 5,774,556 A | 6/1998 | Lowe | | |
| 6,173,061 B1 * | 1/2001 | Norris et al. | .................... | 381/309 |
| 6,185,300 B1 * | 2/2001 | Romesburg | ............. | 379/406.09 |
| 6,324,502 B1 * | 11/2001 | Handel et al. | ................. | 704/226 |
| 6,665,638 B1 * | 12/2003 | Kang et al. | ..................... | 704/224 |
| 6,665,645 B1 * | 12/2003 | Ibaraki | .................... | G10L 15/20 704/226 |
| 6,754,350 B2 | 6/2004 | Sugimoto | | |
| 6,789,066 B2 * | 9/2004 | Junkins | ............... | G10L 19/0018 704/256 |
| 6,993,480 B1 | 1/2006 | Klayman | | |
| 7,046,812 B1 * | 5/2006 | Kochanski et al. | ............. | 381/92 |
| 7,180,892 B1 * | 2/2007 | Tackin | .......................... | 370/389 |
| 7,269,553 B2 * | 9/2007 | Kang et al. | ..................... | 704/224 |
| 7,412,220 B2 | 8/2008 | Beyer | | |
| 7,440,575 B2 | 10/2008 | Kirkeby | | |
| 7,707,034 B2 * | 4/2010 | Sun et al. | ....................... | 704/262 |
| 8,219,390 B1 * | 7/2012 | Laroche | ........................ | 704/207 |
| 2002/0071573 A1 | 6/2002 | Finn | ................................ | 381/93 |
| 2002/0169602 A1 * | 11/2002 | Hodges | ........................ | 704/211 |
| 2003/0040822 A1 * | 2/2003 | Eid et al. | .......................... | 700/94 |
| 2004/0152052 A1 * | 8/2004 | Evans, Jr. | ........................ | 434/29 |
| 2004/0252850 A1 * | 12/2004 | Turicchia et al. | ............. | 381/94.2 |
| 2006/0116874 A1 * | 6/2006 | Samuelsson et al. | ......... | 704/228 |
| 2007/0140499 A1 * | 6/2007 | Davis | ................................ | 381/23 |
| 2008/0071539 A1 * | 3/2008 | Allen | ..................... | G10L 25/48 704/251 |
| 2008/0212794 A1 * | 9/2008 | Ikeda | .................... | H04R 3/005 381/94.1 |
| 2008/0219470 A1 | 9/2008 | Kimijima | | |
| 2009/0299742 A1 * | 12/2009 | Toman et al. | ................. | 704/233 |
| 2009/0326928 A1 * | 12/2009 | Omiya et al. | ............. | 704/200.1 |
| 2010/0063818 A1 * | 3/2010 | Mason et al. | ................. | 704/251 |
| 2010/0179808 A1 | 7/2010 | Brown | | |
| 2010/0198590 A1 * | 8/2010 | Tackin et al. | ................. | 704/214 |
| 2010/0211199 A1 * | 8/2010 | Naik et al. | ...................... | 700/94 |
| 2010/0211388 A1 | 8/2010 | Yu | | |
| 2011/0054887 A1 * | 3/2011 | Muesch | .................... | H04R 5/04 704/225 |
| 2011/0066438 A1 * | 3/2011 | Lindahl et al. | ................ | 704/258 |
| 2011/0119061 A1 * | 5/2011 | Brown | .......................... | 704/258 |

* cited by examiner

Overview of Method for Dialog Enhancement

METHOD AND SYSTEM FOR DIALOG ENHANCEMENT

CROSS REFERENCE TO RELATED APPLICATIONS

This application claims priority to U.S. Provisional Patent Application No. 61/262,019 filed 17 Nov. 2009, hereby incorporated by reference in its entirety.

BACKGROUND OF THE INVENTION

1. Field of the Invention

The invention relates to systems and methods for improving clarity and intelligibility of human speech (dialog) determined by an audio (stereo or multi-channel) signal. In a class of embodiments, the invention is a method and system for improving clarity and/or intelligibility of dialog determined by a stereo input signal by analyzing the input signal to generate filter control values, upmixing the input signal to generate a speech (center) channel and non-speech channels, filtering the speech channel in a peaking filter (steered by at least one of the control values) and attenuating the non-speech channels in a manner also steered by at least some of the control values. Preferably, the control values are generated without use of feedback in a manner including determination of power ratios for pairs of the speech and non-speech channels.

2. Background of the Invention

Throughout this disclosure including in the claims, the term "dialog" is used in a broad sense to denote human speech. Thus, "dialog" determined by an audio signal is audio content of the signal that is perceived as human speech (e.g., dialog, monologue, singing, or other human speech) upon reproduction of the signal by a speaker. In accordance with typical embodiments of the invention, the clarity and/or intelligibility of dialog (determined by an audio signal) is improved relative to other audio content (e.g., instrumental music or non-speech sound effects) determined by the signal.

Typical embodiments of the invention assume that the majority of dialog determined by an input audio signal is either center panned (in the case of a stereo input signal) or determined by the signal's center channel (in the case of a multi-channel input signal). This assumption is consistent with the convention in surround sound production according to which the majority of dialog is usually placed into only one channel (the Center channel), and the majority of music, ambient sound, and sound effects is usually mixed into all the channels (e.g., the Left, Right, Left Surround and Right Surround channels as well as the Center channel).

Thus, the center channel of a multi-channel audio signal will sometimes be referred to herein as the "speech" channel and all other channels (e.g., Left, Right, Left Surround, and Right Surround) channels of the signal will sometimes be referred to herein as "non-speech" channels. Similarly, a "center" channel generated by summing the left and right channels of a stereo signal whose dialog is center panned will sometimes be referred to herein as a "speech" channel, and a "side" channel generated by subtracting such a center channel from the stereo signal's left (or right) channel will sometimes be referred to herein as a "non-speech" channel.

Throughout this disclosure including in the claims, the expression performing an operation "on" signals or data (e.g., filtering, scaling, or transforming the signals or data) is used in a broad sense to denote performing the operation directly on the signals or data, or on processed versions of the signals or data (e.g., on versions of the signals that have undergone preliminary filtering prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout the disclosure including in the claims, the expression "ratio" of a first value ("A") to a second value ("B") is used in a broad sense to denote A/B, or B/A, or a ratio of a scaled or offset version one of A and B to a scaled or offset version of the other one of A and B (e.g., $(A+x)/(B+y)$, where x and y are offset values).

Throughout the disclosure including in the claims, the expression "reproduction" of signals by speakers denotes causing the speakers to produce sound in response to the signals, including by performing any required amplification and/or other processing of the signals.

Human speech consists of perceived cues. As air is expelled from the lungs, the vocal cords vibrate. As the air escapes, the larynx, mouth and nose modify the acoustic energy to produce a variety of sounds. Vowels have regions of strong harmonic energy with unimpeded airflow. Approximants, fricatives and stops increasingly restrict airflow and have higher-frequency content but weaker energy than do vowels.

As people age, they often lose high-frequency sensitivity in their hearing. Persons with mild hearing loss typically hear better in the lower-frequency ranges (vowels) while hearing with difficulty in the higher-frequency ranges. They may have difficulty differentiating between words that begin with approximates, fricatives and stops. Also for persons with mild hearing loss, hearing speech in the presence of other sound (noise) becomes an issue as hearing loss generally tends to reduce the ability to localize and filter out background noise.

Various methods for processing audio signals to improve speech intelligibility are known. For example, the paper by Villchur, E., entitled "Signal Processing to Improve Speech Intelligibility for the Hearing Impaired", 99th Audio Engineering Society Convention, September 1995, discusses a common process for compensating for mild hearing loss: boosting higher frequencies with an equalizer or shelving filter, as well as wideband compressing the speech to bring it above the threshold of hearing. As another example, Thomas, I. and Niederjohn, R., in "Preprocessing of Speech for Added Intelligibility in High Ambient Noise", 34th Audio Engineering Society Convention, March 1968, discuss a shelving or equalization filter to assist non-impaired listeners when the speech is in the presence of noise or when listening at low levels.

It is known to filter an audio signal with a kind of equalization filter known as a peaking filter, to emphasize frequency components of the signal in a frequency range critical to intelligibility of speech, relative to frequency components of the signal outside this frequency range. For example, it is known to use a peaking filter to emphasize frequency components of an audio signal in a range centered on the $3^{rd}$ formant of speech (F3) relative to frequency components outside such range. F3 can vary from approximately 2300 Hz to 3000 Hz in normal human speech.

It is also known to apply attenuation (ducking) to non-speech channels of a multi-channel audio signal, but less (or no) attenuation to the signal's speech channel.

There is a need for a method and system for filtering an audio signal to improve dialog intelligibility in an efficient manner, and in a manner implementable with low processor speed (e.g., low MIPS) requirements. Typical embodiments of the present invention achieve improved dialog intelligibility with reduced computational requirements relative to conventional methods and systems designed to improve dialog intelligibility.

BRIEF DESCRIPTION OF THE INVENTION

In a class of embodiments, the invention is a method and system for enhancing dialog determined by an audio input signal (e.g., a stereo or multi-channel audio input signal). In typical embodiments in which the input signal is a stereo audio signal, the inventive system includes an analysis module (subsystem) configured to analyze the input signal to generate filter control values, and a filtering subsystem. The filtering subsystem includes upmixing circuitry configured to upmix the input signal to generate a speech channel (e.g., by summing the left and right input channels) and non-speech channels (e.g., by subtracting the speech channel from the input signal's left channel and from the input signal's right channel), and a peaking filter steered by at least one of the control values (in the sense that the peaking filter's response is determined by a current value of at least one of the control values), and coupled and configured to filter the speech channel to improve clarity and/or intelligibility of dialog relative to other content determined by the speech channel. The filtering subsystem also includes ducking circuitry (also steered by at least some of the control values) coupled and configured to apply attenuation (ducking) to the non-speech channels, and downmixing circuitry coupled and configured to combine the outputs of the peaking filter and ducking circuitry to generate a filtered stereo output signal. The ducking circuitry is steered by control values in the sense that the attenuation it applies to the non-speech channels is determined by current values of the control values. In some embodiments, the analysis module generates the filter control values using statistics from the upmix and the filtering subsystem determines peaking filter coefficients and ducking coefficients from the filter control values. Typical embodiments assume that the majority of dialog (determined by the stereo input signal) is center panned, and generate the speech channel by summing the input signal's left and right channels (or scaled versions of such left and right channels) and optionally adding an offset thereto.

In typical embodiments in which the input signal is a multi-channel audio signal, the inventive system includes an analysis module (subsystem) and a filtering subsystem. The system (e.g., the analysis module thereof) is configured to downmix the input signal to generate a downmixed stereo signal and the analysis module is coupled and configured to analyze the downmixed stereo signal to generate filter control values (preferably in the same manner as does the analysis module of typical embodiments which operate in response to a stereo input signal). The filtering subsystem includes a peaking filter (steered by at least one of the control values in the sense that its response is determined by a current value of at least one of the control values) coupled and configured to filter the center channel of the input signal (which is assumed to be a speech channel) to improve clarity and/or intelligibility of dialog relative to other content determined by the center channel, and ducking circuitry (also steered by at least some of the control values) coupled and configured to apply attenuation (ducking) to the other channels of the input signal (which are assumed to be non-speech channels). The ducking circuitry is steered by control values in the sense that the attenuation it applies to the non-speech channels is determined by current values of the control values. The outputs of the peaking filter and ducking circuitry determine a filtered, multichannel output signal.

In typical embodiments (regardless of whether the input signal is a stereo or multi-channel signal), the filter control values (for steering the filtering subsystem) are generated without use of feedback by a method including generation of power ratios (for pairs of the speech and non-speech channels) and preferably also shaping in nonlinear fashion and scaling at least one of the power ratios.

In one class of embodiments (regardless of whether the input signal is a stereo or multi-channel signal), the input signal analysis and the filtering are accomplished in the time domain. In other embodiments, they are accomplished in the frequency domain.

In typical embodiments (regardless of whether the input signal is a stereo or multi-channel signal), the analysis module (sometimes referred to herein as a "steering" module) analyzes the input signal in a way that allows it to continuously steer the filtering module. Preferably, the filtering module is an active filter module configured to filter the speech and non-speech channels of the input signal differently based on the filter control values (sometimes referred to herein as steering control signals) asserted thereto from the steering module.

In a class of embodiments, the steering module is configured to perform a 2:M channel (2 channel to M channel, where M is greater than 2) up-mix on a stereo signal (e.g., a downmixed stereo signal generated from a multi-channel audio input signal), and to generate the steering control signals from the resulting M channels. For example, it may be configured to perform a 2:4 upmix to generate center (front), rear, left, and right channels in response to the input left and right channels, to determine power ratios from pairs of samples of the four upmixed channels, and to determine the steering control signals from the power ratios without use of feedback, and preferably including by shaping in nonlinear fashion and scaling samples without use of feedback.

In typical embodiments, the ratio of speech (center) channel power (signal) to power of the non-speech ("side" and/or "rear") channels (noise) is assumed to be similar to a signal-to-noise measurement. For the purpose of dialog enhancement, it is desirable to maximize the signal-to-noise ratio without adversely affecting the mix. To do so, a variable peaking filter is applied to the center channel. The peaking filter is preferably a biquadratic filter having a varying gain and a center frequency centered on the $3^{rd}$ formant of speech, F3 (i.e., in the range from about 2300 Hz to about 3000 Hz). The peaking filter's response (including the gain it applies at the center frequency) is determined dynamically by the strength (power) of the center channel. For example, the analysis module of the inventive system may dynamically determine a control value (Cpow) which is a measure of power of the speech channel of the input signal relative to power of a non-speech channel of the input signal, and the peaking filter's response is dynamically controlled by this control value (e.g., so that the gain it applies at the center frequency is increased in response to an increase in the control value Cpow).

In some embodiments, the ratio of speech channel (center channel) power to non-speech channel (side channel and/or rear channel) power is used to determine how much ducking (attenuation) should be applied to each non-speech channel. For example, in the FIG. 4 embodiment to be described below, the gain applied by ducking amplifiers 8 and 9 may be reduced in response to an increase in a gain control value (output from element 318) that is indicative of relative power (within limits) of the speech channel ("Cin") and non-speech channels (rear channel "Sin," left channel "Lin," and right channel "Rin") determined in the analysis module (i.e., the ducking amplifiers attenuate the non-speech channels by more relative to the speech channel when the speech channel power increases (within limits) relative to the combined power of non-speech (left, right, and rear) channels.

In a class of embodiments, the inventive method and apparatus extracts a speech (center) channel of sound from an audio input signal having multiple channels, detects dialog (human speech) in the extracted center channel and enhances the detected dialog. The method for extracting a center channel from an audio signal having multiple channels and detecting speech in the center channel may include determining power ratios (ratios of individual channel powers, sums of powers of individual channels, and/or differences of powers of individual channels); scaling and smoothing the power ratios; and determining power of the center channel in relation to power of other (non-speech) channels. The method for enhancing dialog may include applying dynamic equalization to the speech channel and non-speech channels (e.g., by filtering the speech channel in a dynamic peaking filter steered by at least one dynamically generated filter control value, and applying dynamically varying attenuation of the non-speech channels relative to the speech channel in a manner steered by at least one dynamically generated filter control value).

In a class of embodiments, the invention is a method for enhancing dialog determined by an audio input signal, said method including the steps of:

(a) analyzing the input signal to generate filter control values without use of feedback; and (b) filtering a speech channel determined by the input signal in a peaking filter steered by at least one of the control values to generate a dialog-enhanced speech channel, and attenuating non-speech channels determined by the input signal in ducking circuitry steered by at least a subset of the control values to generate attenuated non-speech channels.

Preferably, step (a) includes the step of generating power ratios, including at least one ratio of power in a speech channel determined by the input signal to power in a non-speech channel determined by the input signal. Preferably, step (a) also includes steps of shaping in nonlinear fashion and scaling at least one of the power ratios.

In typical embodiments in which the input signal is a stereo signal, the method also includes the step of: (c) combining the dialog-enhanced speech channel and the attenuated non-speech channels to generate a dialog-enhanced stereo output signal. In typical embodiments in which the input signal is a stereo signal, step (b) includes a step of upmixing the input signal to determine the speech channel (e.g., by summing left and right channels of the input signal), a first one of the non-speech channels (e.g., by subtracting the speech channel from the input signal's left channel), and a second one of the non-speech channels (e.g., by subtracting the speech channel from the input signal's right channel).

In typical embodiments in which the input signal is a multi-channel audio signal having more than two channels, step (a) includes the steps of:

(c) downmixing the input signal to generate a downmixed stereo signal; and (d) analyzing the downmixed stereo signal to generate the filter control values.

Also in typical embodiments in which the input signal is a multi-channel audio signal having more than two channels, the dialog-enhanced speech channel and the attenuated non-speech channels generated in step (b) determine a filtered (dialog-enhanced) multi-channel output signal.

In typical embodiments, the inventive system is or includes a general or special purpose processor programmed with software (or firmware) and/or otherwise configured to perform an embodiment of the inventive method. In some embodiments, the inventive system is a general purpose processor, coupled to receive input data indicative of the audio input signal and programmed (with appropriate software) to generate output data indicative of the audio output signal in response to the input data by performing an embodiment of the inventive method. In other embodiments, the inventive system is implemented by appropriately configuring (e.g., by programming) a configurable audio digital signal processor (DSP). The audio DSP can be a conventional audio DSP that is configurable (e.g., programmable by appropriate software or firmware, or otherwise configurable in response to control data) to perform any of a variety of operations on input audio. In operation, an audio DSP that has been configured to perform active dialog enhancement in accordance with the invention is coupled to receive the audio input signal, and the DSP typically performs a variety of operations on the input audio in addition to (as well as) dialog enhancement. In accordance with various embodiments of the invention, an audio DSP is operable to perform an embodiment of the inventive method after being configured (e.g., programmed) to generate an output audio signal in response to the input audio signal by performing the method on the input audio signal.

Aspects of the invention include a system configured (e.g., programmed) to perform any embodiment of the inventive method, and a computer readable medium (e.g., a disc) which stores code for implementing any embodiment of the inventive method.

BRIEF DESCRIPTION OF THE DRAWINGS

FIG. 7(b) is a graph of a peaking filter gain control value (generated from the input signal) as a function of time; FIG. 7(c) is a graph of a ducking amplifier control value (generated from the input signal) as a function of time; and FIG. 7(d) is the waveform of the center channel of an output audio signal generated by filtering the input signal using a peaking filter and ducking amplifiers in response to the peaking filter gain and ducking amplifier control values.

DETAILED DESCRIPTION OF THE PREFERRED EMBODIMENTS

Many embodiments of the present invention are technologically possible. It will be apparent to those of ordinary skill in the art from the present disclosure how to implement them. Embodiments of the inventive system, method, and medium will be described with reference to FIGS. 1-8.

Figure 1:
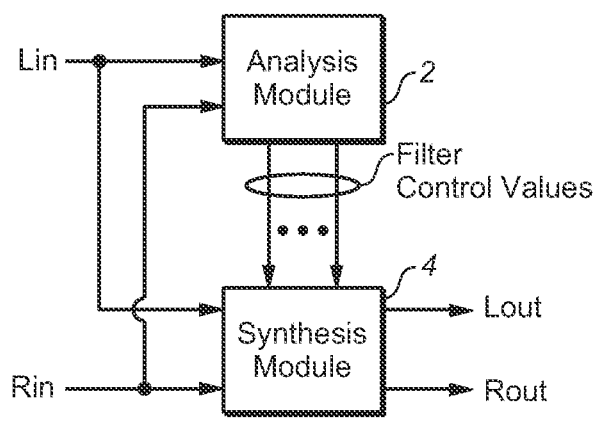
FIG. 1 is a block diagram of an embodiment of the inventive system.

FIG. 1 is a block diagram of an embodiment of the inventive system. The system of FIG. 1 comprises analysis module 2 (configured to analyze a stereo input audio signal to generate filter control values) and synthesis (filtering) module 4, connected as shown to analysis module 2. Filtering module 4 is configured to filter a stereo audio input signal (Lin, Rin) to generate a stereo output signal (Lout, Rout) with enhanced dialog. In FIG. 1, input audio samples Lin (asserted to inputs of each of modules 2 and 4) are time domain samples of the input signal's left channel, and input audio samples Rin (also asserted to inputs of each of modules 2 and 4) are time domain samples of the input signal's right channel.

Figure 2:
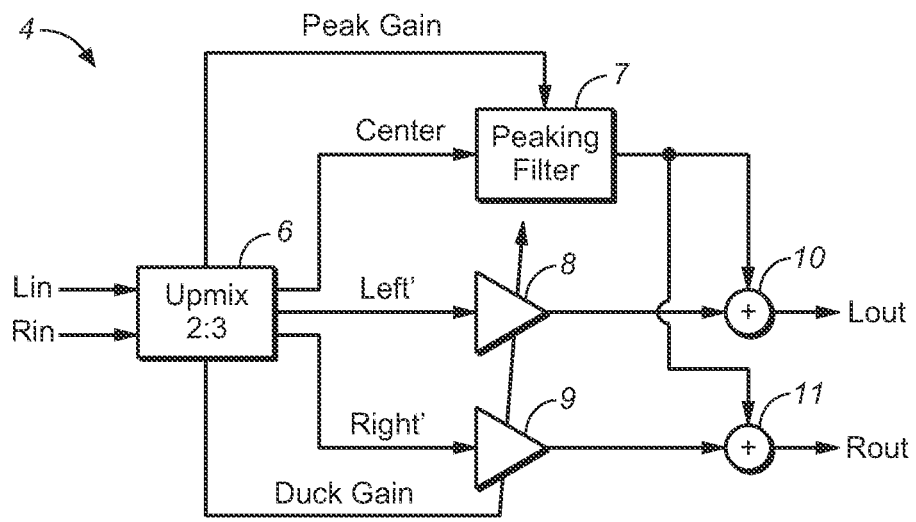
FIG. 2 is a block diagram of an embodiment of synthesis module 4 (sometimes referred to herein as a filtering module) of FIG. 1, for filtering a two channel (stereo) audio input signal.
Figure 3:
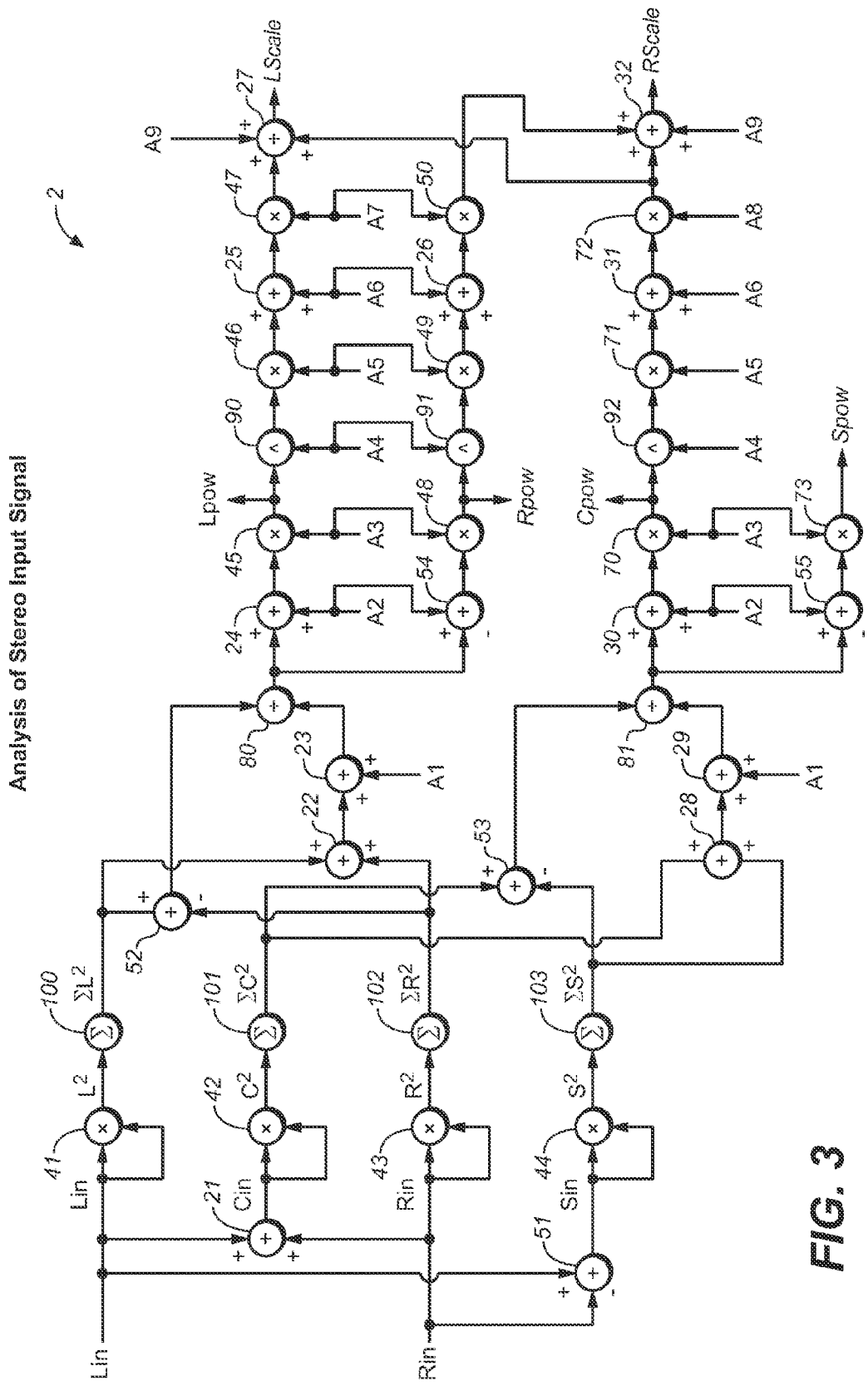
FIG. 3 is a block diagram of an embodiment of analysis module 2 of FIG. 1.

FIG. 3 is a block diagram of an embodiment of analysis module 2 of FIG. 1. Each of FIGS. 2 and 4 is a block diagram of an embodiment of filtering module 4 of FIG. 1.

Figure 4:
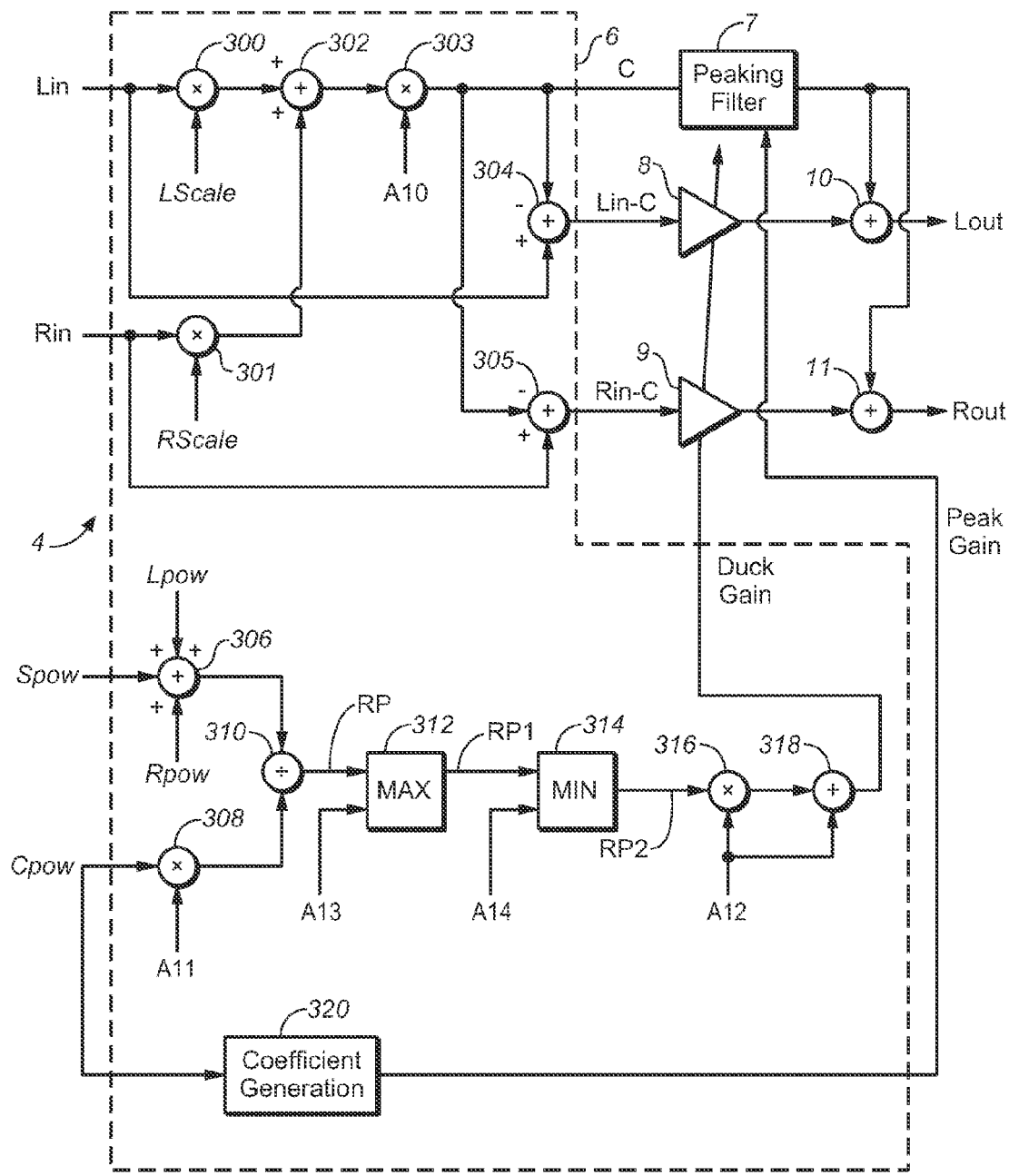
FIG. 4 is a block diagram of an embodiment of filtering module 4 of FIG. 1.

Filtering module 4 of FIGS. 2 and 4 includes upmixing circuitry 6 configured to upmix the input signal to generate a speech channel "C" which it asserts to active peaking filter 7 for filtering therein, and non-speech channels "L" and "R" which it asserts to ducking amplifier 8 and ducking amplifier 9 respectively. Speech channel C is a sequence of audio samples generated by summing scaled versions of the left and right input channels. More specifically (with reference to FIG. 4), multiplication element 300 of upmixing circuitry 6 multiplies each input audio sample Lin by the current value of filter control value "Lscale" from analysis module 2, and multiplication element 301 of circuitry 6 multiplies each input audio sample Rin by the current value of filter control value "Rscale" from analysis module 2. Addition element 302 of circuitry 6 adds together the scaled left and right channel samples output from elements 300 and 301, and to the scaled right channel sample output from element 301, and multiplication element 303 multiplies each scaled value output from element 302 by scaling value "A10" to generate a speech channel sample having the value, C=A10*[(Lin*Lscale)+(Rin*Rscale)].

Subtraction element 304 of upmixing circuitry 6 generates the samples comprising a left side (non-speech) channel, Left'=Lin−C, by subtracting each current sample of the speech channel C from the current left input channel sample, Lin. The non-speech channel Left' thus consists of a sequence of samples having value, Left'=Lin−[A10*[(Lin*Lscale)+(Rin*Rscale)]]. Similarly, subtraction element 305 of circuitry 6 generates the samples comprising right side (non-speech) channel, Right'=Rin−C, by subtracting each current sample of the speech channel "C" from the current right input channel sample, Rin. The non-speech channel Right' thus consists of a sequence of samples having value, Right'=Rin−[A10*[(Lin*Lscale)+(Rin*Rscale)]].

In operation, active peaking filter 7 (of FIGS. 2 and 4) is steered by the "Cpow" control value from analysis module 2. More specifically (with reference to FIG. 4), the "Cpow" control value is asserted to peaking filter control value generation element 320. In response to each value "Cpow", element 320 asserts a peaking filter control value set (identified as "Peak Gain" in FIGS. 2 and 4) to peaking filter 7. In some implementations, element 320 is a look-up table. The peaking filter control value set asserted by element 320 in response to one "Cpow" value consists of N control values, where N can be any positive integer (sufficient to determine the response of filter 7) with the particular value of N depending on the particular implementations of element 320 and filter 7.

Peaking filter 7 is preferably a biquadratic filter having a center frequency centered on the $3^{rd}$ formant of speech, F3 (i.e., in the range from about 2300 Hz to about 3000 Hz) and a varying gain. Peaking filter 7's response (including the gain it applies at the center frequency) is determined dynamically by the "Cpow" control value.

Each set of peaking filter control values asserted to filter 7 by element 320 determines the response (gain and phase as a function of frequency) of filter 7 for filtering the corresponding sample(s) of the speech channel to improve clarity and/or intelligibility of the dialog determined by said speech channel (relative to other content determined by the speech channel). For example, in response to a "Cpow" value indicative of high dialog content in the speech channel, element 320 asserts to filter 7 a control value set that causes filter 7 to apply relatively high gain to frequency components of the speech channel likely to be indicative of dialog (e.g., frequency components in a range centered on the $3^{rd}$ formant of speech) and lower gain to frequency components outside this range; and in response to a "Cpow" value indicative of low dialog content in the speech channel, element 320 asserts to filter 7 a different control value set that causes filter 7 to apply relatively low gain to all frequency components of the speech channel.

Figure 6:
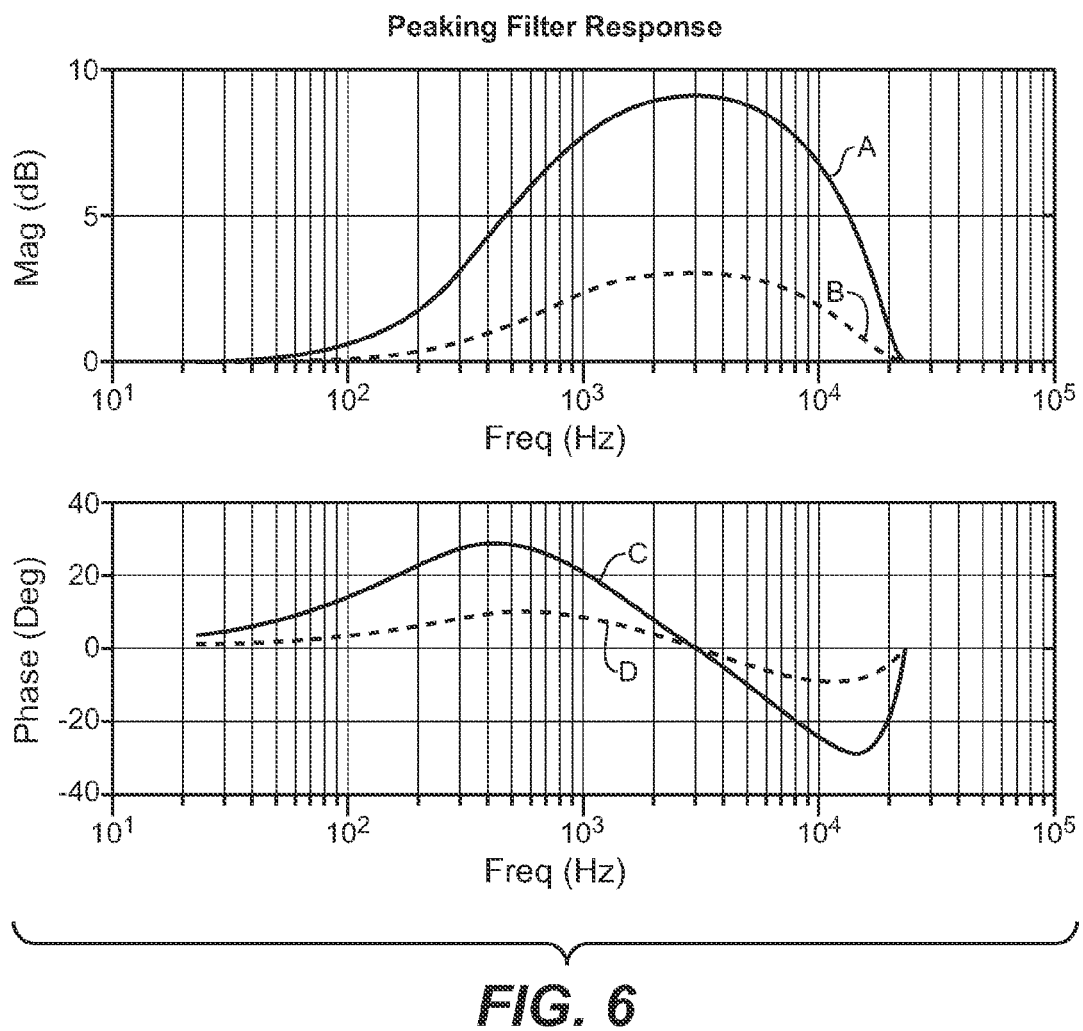
FIG. 6 is a set of two graphs of peaking filter response. The upper graph represents frequency response (gain in dB versus frequency in Hz) for a peaking filter, with curve "A" representing the filter's frequency response in response to a first set of control values from peaking filter control value generation element 320 (of the FIG. 4 embodiment of the inventive filtering subsystem) and curve "B" representing the filter's frequency response in response to a second set of control values from element 320 of FIG. 4. The lower graph represents phase response (phase, in degrees, versus frequency in Hz) for the peaking filter in response to the same control values, with curve "C" representing the filter's phase response in response to the first set of control values and curve "D" representing the filter's phase response in response to the second set of control values.

Two exemplary responses of peaking filter 7, both determinable by control values from peaking filter control value generation element 320 of FIG. 4, are shown in FIG. 6. The upper graph in FIG. 6 represents the two frequency responses (plotted as gain in dB versus frequency in Hz), with curve "A" representing filter 7's frequency response in response to (i.e., as determined by) a first set of control ("Peak Gain") values from element 320 and curve "B" representing the filter's frequency response in response to (i.e., as determined by) a second set of control ("Peak Gain") values from element 320. The lower graph represents phase response (phase in degrees versus frequency in Hz) for peaking filter 7 in response to the same control values from element 320, with curve "C" representing the filter's phase response in response to the first control value set and curve "D" representing the filter's phase response in response to the second control value set.

In operation, active ducking amplifiers 8 and 9 (of FIGS. 2 and 4) are steered by the control values "Cpow," "Spow," "Rpow," and "Lpow" from analysis module 2. Specifically (with reference to FIG. 4), each "Cpow" control value is asserted to an input of multiplication element 308 and each set of contemporaneous "Spow," "Rpow," and "Lpow" values is asserted to inputs of addition element 306. Element 306 adds together the "Spow," "Rpow," and "Lpow" values at its inputs. Element 308 multiplies each "Cpow" value by a scaling value "A11." Division element 310 divides each current value (Spow+Rpow+Lpow) of element 306's output by the current value (A11*Cpow) of element 308's output to generate a value, RP=(Spow+Rpow+Lpow)/(A11*Cpow), that is indicative of relative power of the speech channel (Cin) and non-speech channels (rear, left, and right channels) determined in analysis module 2.

Each value RP and a limiting value A13 are asserted to inputs of logic element 312. In response, element 312 outputs a value RP1 equal to the greater of RP and A13. Each value RP1 and a limiting value A14 are asserted to inputs of logic element 314. In response, element 314 outputs a value RP2 equal to the lesser of RP1 and A14. Each value RP2 is multiplied by scaling value A12 in multiplication element 316, and the output of element 316 is added to the scaling value A12 in addition element 318. The scaled relative power value output from element 318 is a ducking amplifier gain control value (identified as "Duck Gain" in FIG. 4). The current "Duck Gain" value is asserted to each of ducking amplifiers 8 and 9, to determine the amount of attenuation applied by amplifiers 8 and 9 to the current values of the non-speech (side) channel samples, Lin-C and Rin-C, from elements 304 and 305. For example, the gain applied by amplifiers 8 and 9 is reduced when the "Duck Gain" value is reduced, as may occur when the power of the speech channel (channel Cin determined in analysis module 2) increases relative to the power of non-speech channels (rear channel "Sin," left channel "Lin," and right channel "Rin" determined in analysis module 2). In other words, ducking amplifiers 8 and 9 may attenuate the non-speech channels by more relative to the speech channel when the speech channel power increases (within limits) relative to the combined power of the (left, right, and rear) non-speech channels.

Downmixing circuitry 10 and 11 of the filtering subsystem of FIGS. 2 and 4 is coupled and configured to combine the outputs of peaking filter 7 and ducking circuitry 8 and 9 to generate a filtered stereo output signal comprising left channel "Lout" and right channel "Rout." Specifically, addition element 10 adds each filtered center channel sample asserted at the output of peaking filter 7 to the attenuated left side channel sample contemporaneously asserted at the output of amplifier 8 to generate the filtered (dialog enhanced) left channel sample "Lout." Similarly, addition element 11 adds each filtered center channel sample asserted at the output of peaking filter 7 to the attenuated right side channel sample contemporaneously asserted at the output of amplifier 9 to generate the filtered (dialog enhanced) right channel sample "Rout."

The manner in which filter control values LScale, RScale, Lpow, Rpow, Cpow, and Spow are generated in an embodiment of analysis module 2 will be described with reference to FIG. 3.

In the FIG. 3 embodiment, analysis module 2 generates the filter control values using statistics from a 2:4 upmix of the stereo input signal, in a manner assuming that the majority of dialog (determined by the stereo input signal) is center panned. The FIG. 3 embodiment is configured to determine power ratios from pairs of samples of the four upmixed channels and to determine the filter control values from the power ratios without use of feedback, including by performing shaping in nonlinear fashion and scaling on samples without use of feedback.

Neither the FIG. 3 nor the FIG. 4 circuitry generates or uses feedback. Instead, the analysis module of FIG. 3 relies on analysis of a nonlinear representation of power ratio values to be described herein. Peaking filter 7 and ducking amplifiers 8 and 9 of FIG. 4 are steered in response to filter control values Lscale, Rscale, Cpow, Spow, Lpow, and Rpow which are generated dynamically by the analysis module.

The FIG. 3 circuitry includes multiplication elements 41, 42, 43, 44, 45, 46, 47, 48, 49, 50, 70, 71, 72, and 73, summation elements 100-103, addition elements 21, 22, 23, 24, 25, 26, 27, 28, 29, 30, 31, and 32, subtraction elements 51, 52, 53, 54, and 55, division elements 80 and 81, and exponentiation elements 90, 91, and 92, connected as shown. The circuitry operates in the following manner in response to assertion of left and right channels of an audio signal to its inputs.

Input audio samples Lin and Rin are time domain samples of the left channel and right channel, respectively, of the input audio signal. Input audio sample sequence Lin is asserted to multiplication element 41, addition element 21, and subtraction element 51, and input audio sample sequence Rin is asserted to multiplication element 43, addition element 21, and subtraction element 51.

The FIG. 3 circuitry performs a 2:4 upmix in which it generates center (Cin) and rear (Sin) channels in response to left (Lin) and right (Rin) stereo input channels, and uses the resulting four channels (i.e., four sequences of Cin, Sin, Lin, and Rin samples) to generate power ratios. Specifically, addition element 21 sums each input left channel audio sample Lin with the contemporaneous right channel audio sample Rin to generate a sample, Cin, of the center (speech) channel. Subtraction element 51 subtracts each input right channel audio sample Rin from the contemporaneous left channel audio sample Lin to generate a sample, Sin, of the rear (non-speech) channel. Each sample "Cin" output from element 21 has characteristics of a "center" or "front" channel sample and will sometimes be referred to herein as a sample of a "front" channel. Each sample "Sin" has characteristics of a "rear" channel sample and will sometimes be referred to herein as a sample of a "rear" channel.

Each input sample Lin is multiplied by itself in element 41 to generate a sample, $L^2$, which is a power measurement for the left input channel, and each input sample Rin is multiplied by itself in element 43 to generate a sample, $R^2$, which is a power measurement for the right input channel. Similarly, each speech channel sample Cin is multiplied by itself in element 42 to generate a sample, $C^2$, which is a power measurement for the front channel, and each rear channel sample Sin is multiplied by itself in element 44 to generate a sample, $S^2$, which is a power measurement for the rear channel. Samples $C^2$ are power measurements on a per-sample basis for the speech (front) channel, and samples $L^2$, $R^2$, and $S^2$ are power measurements on a per-sample basis for the non-speech channels.

Although the circuitry of FIG. 3 and FIG. 4 operates in the time domain, other embodiments of the invention perform input signal analysis and filtering in the frequency domain on input streams of frequency components (e.g., left and right channel frequency components). For example, in some such alternative embodiments, streams of time-domain input data samples are asserted to a time domain-to-frequency domain transform stage coupled and configured to generate the right channel frequency components by performing a time-to-frequency domain transform (e.g., a Discrete Fourier transform, but alternatively a Modified Discrete Cosine Transform, or a transform in a Quadrature Mirror Filterbank, or another time domain-to-frequency domain transform) on the right channel input stream and the left channel frequency components by performing a time-to-frequency domain transform on the left channel input stream. Typically, each block of input audio transformed by the time domain-to-frequency domain transform stage would consist of 1024 (or 512) samples of each channel of the input audio, and the output of the time domain-to-frequency domain transform stage in response to each such block would be a set of frequency components in 512 (or 256) bins for each input audio channel.

With reference again to FIG. 3, during each time interval of duration equal to k sample periods, each of summation elements 100-103 sums together each sample in a set ("block") of k consecutive samples asserted thereto. During the next time interval of k sample periods, a new block of samples is asserted to the input of each of elements 100-103, and each of elements 100-103 and asserts at its output the sum of samples it generated during the previous k sample periods. Thus, the output of each of elements 100-103 is updated once per each k sample periods. More specifically, element 100 receives a sequence of blocks of k samples $L^2$ (typically k=512 or k=256), and during assertion of the "Mth" block of k samples $L^2$ to its input (where "M" is an integer) element 100 asserts at its output the sum ($\Sigma L^2$) of samples in the previous ("(M−1)th") block of k samples $L^2$. Similarly, element 101 receives a sequence of blocks of k samples $C^2$, and during assertion of the "Mth" block of samples $C^2$ to its input, element 101 asserts at its output the sum ($\Sigma C^2$) of samples in the previous ("(M−1)th") block of k samples $C^2$, element 102 receives a sequence of blocks of k samples $R^2$, and during assertion of the "Mth" block of samples $R^2$ to its input, element 102 asserts at its output the sum ($\Sigma R^2$) of samples in the previous block of k samples $R^2$, and element 103 receives a sequence of blocks of k samples $S^2$, and during assertion of the "Mth" block of samples $S^2$ to its input, element 103 asserts at its output the sum ($\Sigma S^2$) of samples in the previous block of k samples $S^2$.

Analysis module 2 of FIG. 3 generate a set of control values Lpow, Rpow, Cpow, Spow, LScale, and RScale once per each block of k sample periods (once in response to each set of sums of samples $\Sigma C^2$, $\Sigma L^2$, $\Sigma R^2$, and $\Sigma S^2$ clocked out simultaneously from elements 100-103), and one updated set of the control values per each block of k sample periods is accepted and used by the FIG. 4 circuitry.

In alternative implementations of analysis module 2 of FIG. 3, each of elements 100-103 outputs, once per each k sample periods, the average (rather than the sum) of each block of k samples asserted to its input. In alternative embodiments of the inventive analysis module, elements 100-103 are omitted and control values (e.g., Lpow, Rpow, Cpow, Spow, LScale, and Rscale) are updated (i.e., generated in response to a set of four samples $C^2$, $L^2$, $R^2$, and $S^2$ output contemporaneously from elements 41, 42, 43, and 44) once per each single sample period.

Once per each k sample periods, the FIG. 4 circuitry (described above) accepts an updated set of control values Lpow, Rpow, Cpow, Spow, LScale, and RScale generated by the FIG. 3 circuitry. Thus, the control values used by the FIG. 4 circuitry are updated once per each set of k consecutive samples Lin and Rin that is filtered by the FIG. 4 circuitry. The same samples Lin and Rin that are asserted to the inputs of the FIG. 3 circuitry (the analysis module) are also asserted to the inputs of the FIG. 4 circuitry (for filtering in accordance with the invention in the FIG. 4 circuitry) but these samples are preferably delayed by an appropriate time (e.g., k sample periods or slightly more than k sample periods) before being asserted to the FIG. 4 circuitry, so that the appropriate updated set of control values (Lpow, Rpow, Cpow, Spow, LScale, and Rscale) from the FIG. 3 circuitry is available to filter each set of samples Lin and Rin the FIG. 4 circuitry.

With reference again to FIG. 3, element 22 generates the sum ($\Sigma L^2 + \Sigma R^2$) of each contemporaneous pair of power value sums $\Sigma L^2$ and $\Sigma R^2$ clocked out of elements 100 and 102, and element 52 generates the difference ($\Sigma L^2 - \Sigma R^2$) of these power value sums. Element 23 adds a small offset value A1 to the output of element 22 (to avoid error in division in element 80), and element 80 generates (and asserts to elements 24 and 54) a sample indicative of the ratio of each contemporaneous pair of values output from elements 52 and 23. Each value generated in element 80 is a power ratio, ($\Sigma L^2 - \Sigma R^2$)/(A1+$\Sigma L^2 + \Sigma R^2$).

Element 28 generates the sum ($\Sigma C^2 + \Sigma S^2$) of each contemporaneous pair of power value sums $\Sigma C^2$ and $\Sigma S^2$ clocked out of elements 101 and 103, and the difference ($\Sigma C^2 - \Sigma S^2$) of these power value sums is generated in element 53. Element 29 adds offset value A1 to the output of element 28 (to avoid error in division in element 81), and element 81 generates (and asserts to elements 30 and 55) a sample indicative of the ratio of each contemporaneous pair of output values from elements 53 and 29. Each value generated in element 81 is a power ratio, ($\Sigma C^2 - \Sigma S^2$)/(A1+$\Sigma C^2 + \Sigma S^2$), where $\Sigma C^2$ is a measure of speech channel power and $\Sigma S^2$ is a measure of rear channel power.

Elements 24, 45, 90, 46, 25, 47, 27, 54, 48, 91, 49, 26, 50, and 32 perform scaling and shaping on the power ratios determined in element 80. Elements 30, 70, 92, 71, 31, 72, 32, 55, and 73 perform scaling and shaping on the power ratios determined in element 81.

Specifically, element 24 adds a small offset value A2 to, and element 54 subtracts the offset value A2 from, each power ratio from element 80. Element 45 multiplies the output of element 24 by coefficient A3 to generate the control value Lpow. Element 48 multiplies the output of element 24 by the coefficient A3 to generate the control value Rpow.

Element 90 exponentiates the control value Lpow using coefficient A4 to generate the value Lpow$^{A4}$. Typically, the coefficient A4 is equal to 3 (or a number substantially equal to 3). In the case that A4=3, element 90 exponentiates each value Lpow by multiplying Lpow by itself and multiplying the product by Lpow. Element 46 multiplies each value output from element 90 by the coefficient A5, element 25 adds a small offset value A6 to each value from element 46, element 47 multiplies the output of element 25 by a coefficient A7, and element 27 adds together a small offset value A9 and each pair of values contemporaneously output from elements 47 and 72 to generate the control value Lscale.

Element 91 exponentiates the control value Rpow using coefficient A4 to generate the value Rpow$^{A4}$. In the case that A4=3, element 91 exponentiates each value Rpow by multiplying Rpow by itself and multiplying the product by Rpow. Element 49 multiplies each value output from element 91 by the coefficient A5, element 26 adds the offset value A6 to each value from element 49, and element 50 multiplies the output of element 26 by the coefficient A7.

Element 30 adds the offset value A2 to each power ratio from element 81. Element 55 subtracts each power ratio from element 81 from the offset value A2. Element 70 multiplies the output of element 30 by coefficient A3 to generate the control value Cpow. Element 73 multiplies the output of element 55 by the coefficient A3 to generate the control value Spow.

Element 92 exponentiates the control value Cpow using the coefficient A4 to generate the value Cpow$^{A4}$. In the case that A4=3, element 90 exponentiates each value Cpow by multiplying Cpow by itself and multiplying the product by Cpow. Element 71 multiplies each value output from element 92 by the coefficient A5, element 31 adds the offset value A6 to each value from element 71, element 72 multiplies the output of element 31 by a coefficient A8, and element 32 adds together the offset value A9 and each pair of values contemporaneously output from elements 72 and 50 to generate the control value Rscale.

Because each of elements 90, 91, and 92 modifies the values it receives from the previous stage nonlinearly, the FIG. 3 circuitry shapes the power ratios generated in elements 80 and 81 in nonlinear fashion.

In a preferred embodiment of the FIG. 3 circuitry, the values A1, A2, A3, A4, A5, A6, A7, A8, and A9 are as follows: A1=0.0001, A2=1.0001, A3=0.492, A4=3, A5=0.95, A6=0.01, A7=−0.2700, A8=0.1125, and A9=0.2620. The particular choice of values A1, A2, A3, A4, A5, A6, A7, A8, and A9 depends on the type of processor used to make the calculations (e.g., fixed or floating point, precision, and so on).

Figure 7:
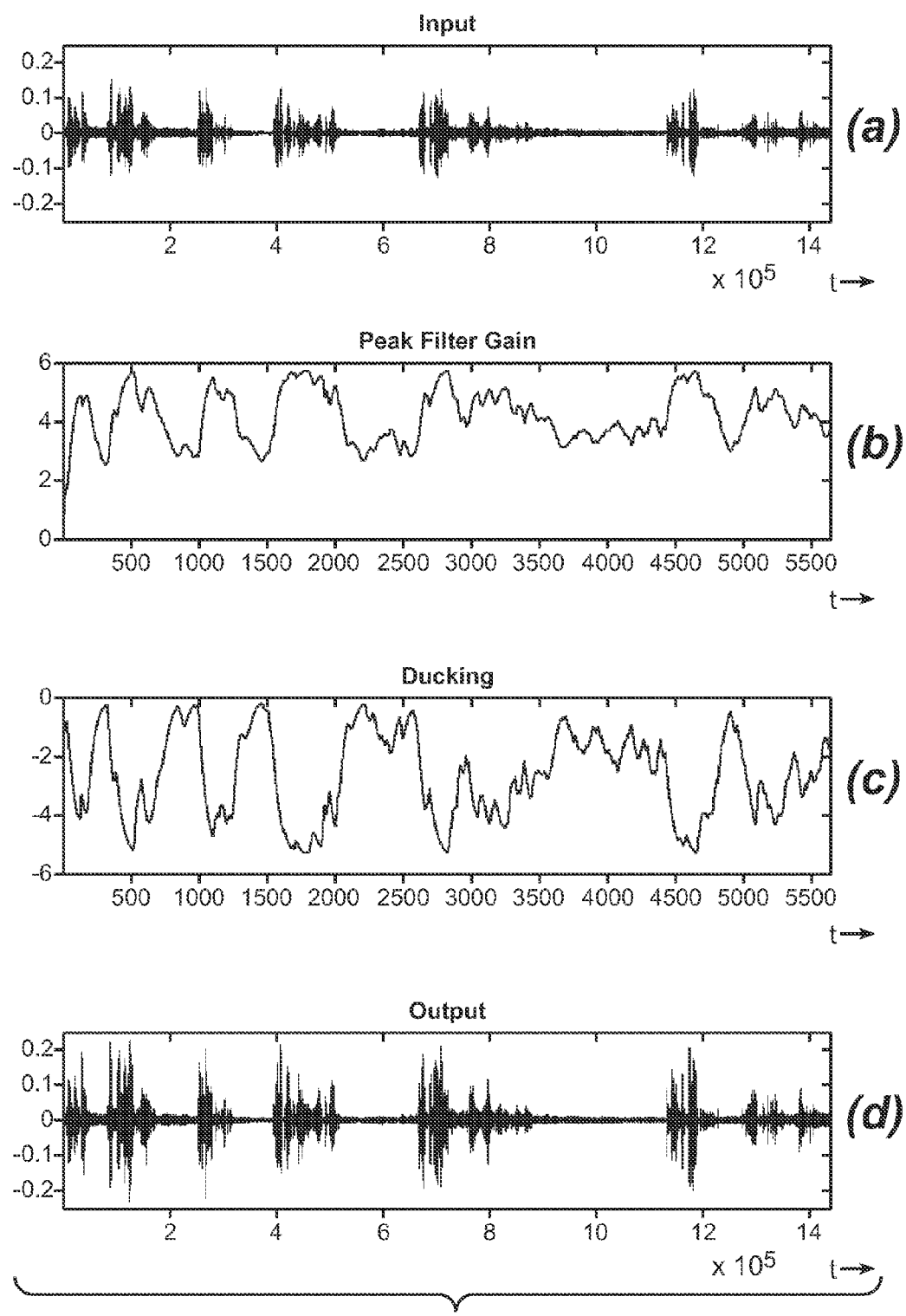
FIG. 7 is a set of four graphs representing signals and control values received or generated during performance of an embodiment of the inventive method: the upper graph (FIG. 7(a)) is the waveform of the center channel of an audio input signal.

FIG. 7 is a set of four graphs representing signals and control values received or generated during performance of an embodiment of the inventive method: the upper graph (FIG. 7(a)) is the waveform of the center channel of an audio input signal; FIG. 7(b) is a graph of a peaking filter gain control value (generated from the input signal) as a function of time; FIG. 7(c) is a graph of a ducking amplifier control value (generated from the input signal) as a function of time; and FIG. 7(d) is the waveform of the center channel of an output audio signal generated by filtering the input signal using a peaking filter and ducking amplifiers in response to the peaking filter gain and ducking amplifier control values. Time is plotted on the horizontal axes of FIGS. 7(a)-7(d) with time increasing from left to right. The time values are aligned so that the same horizontal position in each of FIGS. 7(a)-7(d) represents the same time, and time is plotted in numbers of sample periods in FIGS. 7(a) and 7(d) and in blocks of the sample periods in FIGS. 7(b) and 7(c), with each block of sample periods consisting of 128 consecutive sample periods.

The segments of FIG. 7(a) having relatively large amplitude represent dialog determined by the input signal, and the segments of FIG. 7(a) having relatively small amplitude represent background music and/or ambient sound. In comparison, the segments of FIG. 7(d) having relatively large amplitude represent dialog (determined by the output signal) that has been enhanced in accordance with the exemplary embodiment of the invention, and the segments of FIG. 7(d) having relatively small amplitude represent background music (and/or ambient sound) that is not significantly altered in accordance with the exemplary embodiment of the invention.

Figure 5:
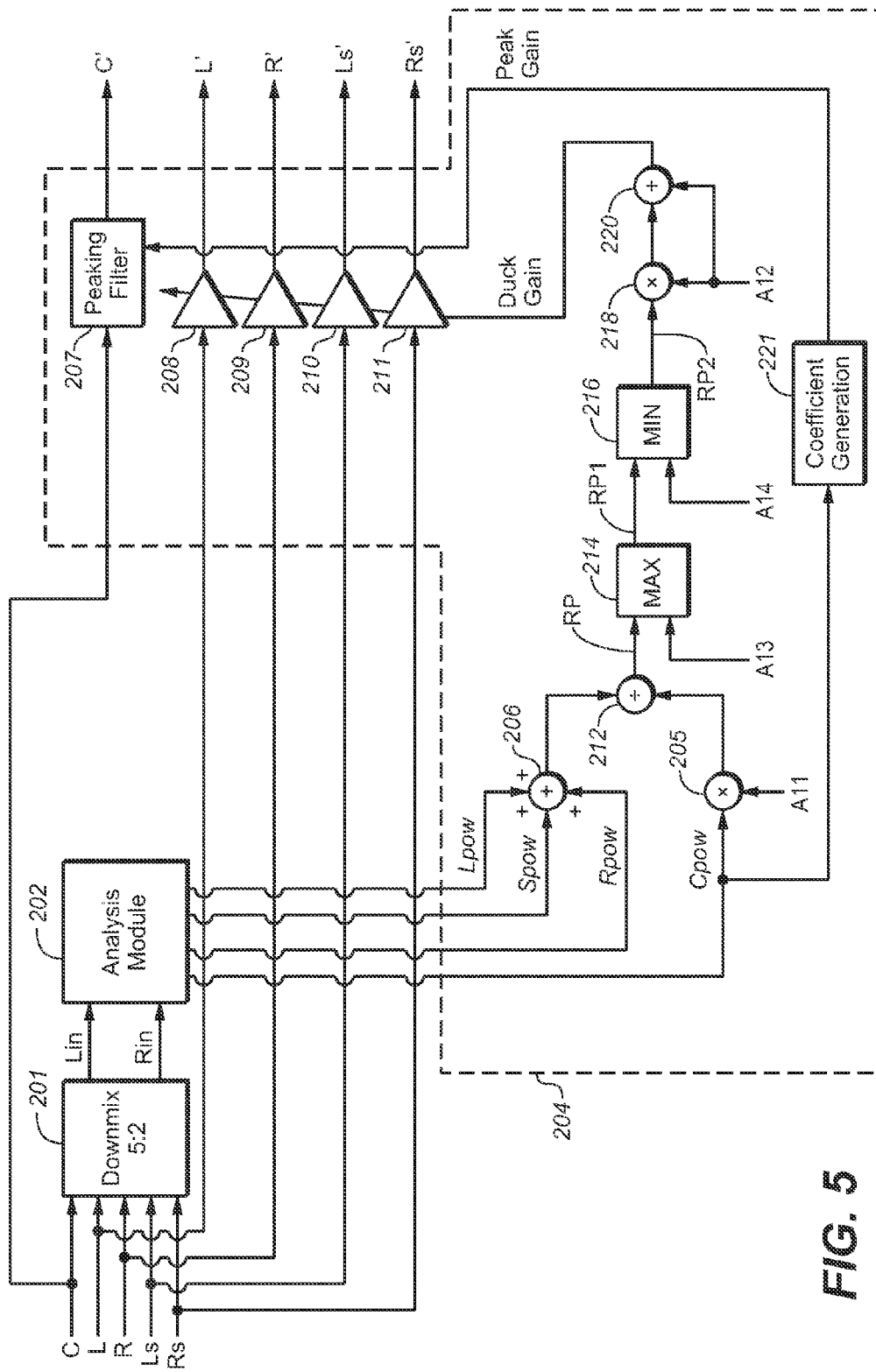
FIG. 5 is a block diagram of a preferred embodiment of the inventive system for filtering a five-channel (surround sound) audio input signal.

FIG. 5 is a block diagram of another embodiment of the inventive system, which include downmixing subsystem (downmixing module) 201, analysis subsystem (analysis module) 202, and filtering subsystem (filtering module) 204, connected as shown. In response to a multi-channel audio signal asserted to the inputs of the FIG. 5 system, subsystem 201 is configured to downmix the input signal to generate a downmixed stereo signal. Analysis module 202 is coupled and configured to analyze the downmixed stereo signal to generate filter control values. Preferably, analysis module 202 is identical to analysis module 2 of FIG. 3.

Filtering subsystem 204 includes active peaking filter 207, which is steered by filter control value Cpow from module 202, and is coupled and configured to filter the center channel of the input signal (which is assumed to be a speech channel) to improve clarity and/or intelligibility of dialog relative to other content determined by the center channel. Filtering subsystem 204 also includes active ducking amplifiers 208, 209, 210, and 211, which are steered by filter control values Cpow, Lpow, Rpow, and Lpow from module 202, and are coupled and configured to apply attenuation (ducking) to the other channels of the input signal (which are assumed to be non-speech channels). The outputs of peaking filter 207 and ducking circuitry 208-211 determine a filtered, multichannel output signal.

The multi-channel input signal consists of center (speech) channel C, and left, right, left surround and right surround (non-speech) channels, L, R, Ls, and Rs, respectively. Each of the speech and non-speech channels is a sequence of audio samples. In response to the input signal, downmixing module 201, downmixes the five input channels in a conventional manner to generate the two downmixed left and right channels, Lin and Rin, of the downmixed stereo signal.

In operation, active peaking filter 207 is steered by the "Cpow" control value from analysis module 202 as follows. The "Cpow" control value is asserted to peaking filter control value generation element 221. In response to each value "Cpow", element 221 asserts a peaking filter control value set (identified as "Peak Gain" in FIG. 5) to peaking filter 207. In some implementations, element 221 is a look-up table. The peaking filter control value set asserted by element 221 in response to one "Cpow" value consists of N control values, where N can be any positive integer (sufficient to determine the response of filter 207) with the particular value of N depending on the particular implementations of element 221 and filter 207.

Peaking filter 207 is preferably a biquadratic filter having a center frequency centered on the $3^{rd}$ formant of speech, F3 (i.e., in the range from about 2300 Hz to about 3000 Hz) and a varying gain. Peaking filter 207's response (including the gain it applies at the center frequency) is determined dynamically by the "Cpow" control value.

Each set of peaking filter control values asserted to filter 207 by element 221 determines the response (gain and phase as a function of frequency) of filter 207 for filtering the corresponding sample(s) of the speech channel to improve clarity and/or intelligibility of the dialog determined by said speech channel (relative to other content determined by the speech channel). Control value generation element 221 of FIG. 5 can be identical to above-described peaking filter control value generation element 320 of FIG. 4.

In operation, active ducking amplifiers 208, 209, 210, and 211 are steered by the control values "Cpow," "Spow," "Rpow," and "Lpow" from analysis module 202 as follows. Each "Cpow" control value is asserted to an input of multiplication element 205 and each set of contemporaneous "Spow," "Rpow," and "Lpow" values is asserted to inputs of addition element 206. Element 206 adds together the "Spow," "Rpow," and "Lpow" values at its inputs. Element 205 multiplies each "Cpow" value by a scaling value "A11." Division element 212 divides each current value (Spow+Rpow+Lpow) of element 206's output by the current value (A11*Cpow) of element 205's output to generate a value, RP=(Spow+Rpow+Lpow)/(A11*Cpow), that is indicative of relative power of the speech channel (Cin) and non-speech channels (rear, left, and right channels) determined in analysis module 202.

Each value RP and a limiting value A13 are asserted to inputs of logic element 214. In response, element 214 outputs a value RP1 equal to the greater of RP and A13. Each value RP1 and a limiting value A14 are asserted to inputs of logic element 216. In response, element 216 outputs a value RP2 equal to the lesser of RP1 and A14. Each value RP2 is multiplied by scaling value A12 in multiplication element 218, and the output of element 218 is added to the scaling value A12 in addition element 220. The scaled relative power value output from element 220 is a ducking amplifier gain control value (identified as "Duck Gain" in FIG. 5). The current "Duck Gain" value is asserted to each of ducking amplifiers 208, 209, 210, and 211 to determine the amount of attenuation applied by these amplifiers to the current values of the non-speech channel samples, L, R, Ls, and Rs, of the input multi-channel signal. For example, the gain applied by amplifiers 208-211 is reduced when the "Duck Gain" value is reduced, as may occur when the power of the speech channel (channel "Cin" determined in analysis module 202) increases relative to the power of non-speech channels (rear channel "Sin," left channel "Lin," and right channel "Rin" determined in analysis module 202). In other words, ducking amplifiers 208-211 may attenuate the non-speech channels by more relative to the speech channel when the speech channel power increases (within limits) relative to the combined power of the non-speech channels.

The filtered (dialog enhanced) multi-channel output signal of the FIG. 5 system comprises the filtered center channel C' output from filter 207, and the attenuated non-speech channels L', R', Ls', and Rs' output from amplifiers 208, 209, 210, and 211, respectively.

As mentioned, filter control values Lpow, Rpow, Cpow, and Rpow are preferably generated in an embodiment of analysis module 202 in a manner identical to that in which the identically named control values are generated in the FIG. 3 embodiment of analysis module of FIG. 1. With such a preferred embodiment of analysis module 202, the FIG. 5 system does not generate or use feedback. Instead, such preferred embodiment of analysis module 202 of FIG. 5 relies on analysis of a nonlinear representation of power ratio values, and peaking filter 207 and ducking amplifiers 208-211 of FIG. 5 are steered in response to filter control values Cpow, Spow, Lpow, and Rpow which are generated dynamically by the analysis module.

In a preferred embodiment of the FIG. 4 circuitry, the values A10, A11, A12, A13, and A14 are as follows: A10=1.4142, A11=3.0, A12=0.5, A13=1, and A14=0. The particular choice of values A10, A11, A12, A13, and A14 depends on the type of processor used to make the calculations (e.g., fixed or floating point, precision, and so on).

In a class of embodiments, the invention is a method for enhancing dialog determined by an audio input signal. The method includes the steps of:

(a) analyzing the input signal to generate filter control values without use of feedback; and (b) filtering a speech channel determined by the input signal in a peaking filter steered by at least one of the control values to generate a dialog-enhanced speech channel, and attenuating non-speech channels determined by the input signal in ducking circuitry steered by at least a subset of the control values to generate attenuated non-speech channels.

Preferably, step (a) includes the step of generating power ratios, including at least one ratio of power in a speech channel (determined by the input signal) to power in a non-speech channel (also determined by the input signal). Preferably, step (a) also includes steps of shaping in nonlinear fashion and scaling at least one of the power ratios.

In typical embodiments in which the input signal is a stereo signal, the method also includes the step of: (c) combining the dialog-enhanced speech channel and the attenuated non-speech channels to generate a dialog-enhanced stereo output signal. In typical embodiments in which the input signal is a stereo signal, step (b) includes a step of upmixing the input signal to determine the speech channel (e.g., by summing left and right channels of the input signal), a first one of the non-speech channels (e.g., by subtracting the speech channel from the input signal's left channel), and a second one of the non-speech channels (e.g., by subtracting the speech channel from the input signal's right channel).

In typical embodiments in which the input signal is a multi-channel audio signal having more than two channels, step (a) includes the steps of:

(c) downmixing the input signal to generate a downmixed stereo signal; and (d) analyzing the downmixed stereo signal to generate the filter control values.

In typical embodiments in which the input signal is a multi-channel audio signal having more than two channels, the dialog-enhanced speech channel and the attenuated non-speech channels generated in step (b) determine a filtered (dialog-enhanced) multi-channel output signal.

Figure 8:
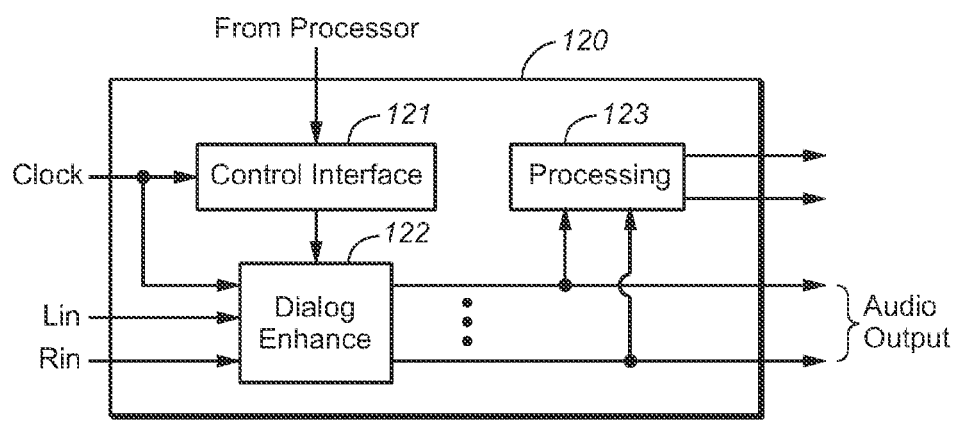
FIG. 8 is a block diagram of an audio digital signal processor (DSP) that is an embodiment of the inventive system.

FIG. 8 is a block diagram of a system 120, which is a programmable audio DSP that has been configured to perform an embodiment of the inventive method. System 120 includes programmable DSP circuitry 122 (an active dialog enhancement module of system 120) coupled to receive an audio input signal (e.g., channels Lin and Rin of a stereo audio signal of the type described with reference to FIGS. 1-4). Circuitry 122 is configured in response to control data from control interface 121 to perform an embodiment of the inventive method, to generate a dialog-enhanced output audio signal in response to the audio input signal. To program system 120, appropriate software is asserted from an external processor to control interface 121, and interface 121 asserts in response appropriate control data to circuitry 122 to configure the circuitry 122 to perform the inventive method.

In operation, an audio DSP that has been configured to perform dialog enhancement in accordance with the invention (e.g., system 120 of FIG. 8) is coupled to receive an N-channel audio input signal, and the DSP typically performs a variety of operations on the input audio (or a processed version thereof) in addition to (as well as) dialog enhancement. For example, system 120 of FIG. 8 may be implemented to perform other operations (on the output of circuitry 122) in processing subsystem 123. In accordance with various embodiments of the invention, an audio DSP is operable to perform an embodiment of the inventive method after being configured (e.g., programmed) to generate an output audio signal in response to an input audio signal by performing the method on the input audio signal.

In some embodiments, the inventive system is or includes a general purpose processor coupled to receive or to generate input data indicative of multiple (at least two) audio input channels, and programmed with software (or firmware) and/or otherwise configured (e.g., in response to control data) to perform any of a variety of operations on the input data, including an embodiment of the inventive method. Such a general purpose processor would typically be coupled to an input device (e.g., a mouse and/or a keyboard), a memory, and a display device. For example, the system of FIG. 1 or 5 could be implemented in a general purpose processor, with inputs Lin and Rin being data indicative of left and right audio input channels (or inputs C, L, R, Ls, and Rs of FIG. 5 being data indicative of a five channels of a surround sound signal), and outputs Lout and Rout being output data indicative of dialog-emphasized left and right audio output channels (or outputs C', L', R', Ls', and Rs' of FIG. 5 being data indicative of a five channels of a dialog-enhanced surround sound signal). A conventional digital-to-analog converter (DAC) could operate on this output data to generate analog versions of the output audio channel signals for reproduction by physical speakers.

While specific embodiments of the present invention and applications of the invention have been described herein, it will be apparent to those of ordinary skill in the art that many variations on the embodiments and applications described herein are possible without departing from the scope of the invention described and claimed herein. It should be understood that while certain forms of the invention have been shown and described, the invention is not to be limited to the specific embodiments described and shown or the specific methods described.

What is claimed is:

1. A method for enhancing dialog determined by an audio input signal, said method including the steps of:
   (a) analyzing the input signal to generate filter control values without use of feedback; and
   (b) providing at least one of the control values to a peaking filter, filtering a speech channel determined by the input signal in the peaking filter in a manner steered by said at least one of the control values to generate a dialog-enhanced speech channel, and attenuating non-speech channels determined by the input signal in ducking circuitry steered by at least a subset of the control values to generate attenuated non-speech channels, where the control values are distinct from the speech channel, the control values are distinct from the non-speech channels, the peaking filter is distinct from the ducking circuitry, the peaking filter is coupled and configured to filter the speech channel but not the non-speech channels, the ducking circuitry is coupled and configured to attenuate the non-speech channels but not the speech channel, the peaking filter is configured to emphasize frequency components of the speech channel in a frequency range critical to intelligibility of speech, relative to frequency components of the speech channel outside the frequency range, and said frequency range has a center frequency,
   wherein the step of attenuating the non-speech channels includes reducing gain application to the non-speech channels in response to a change in said at least a subset of the control values indicative of increase of power of the speech channel relative to combined power of the non-speech channels, and the step of filtering the speech channel includes applying more gain to the frequency components of the speech channel at the center frequency in response to a change in said at least one of the control values indicative of an increase in power of the speech channel relative to power of at least one of the non-speech channels.

2. The method of claim 1, wherein step (a) includes a step of generating power ratios, including at least one ratio of power in a speech channel determined by the input signal to power in a non-speech channel determined by the input signal.

3. The method of claim 2, wherein step (a) also includes a step of shaping in nonlinear fashion and scaling at least one of the power ratios.

4. The method of claim 3, wherein said shaping in nonlinear fashion includes a step of exponentiating at least one value determined from at least one of the power ratios.

5. The method of claim 1, wherein the input signal is a stereo signal, and also including the step of:
   (c) combining the dialog-enhanced speech channel and the attenuated non-speech channels to generate a dialog-enhanced stereo output signal.

6. The method of claim 5, wherein the stereo signal includes a left channel and a right channel, step (b) includes a step of upmixing the input signal to determine a first one of the non-speech channels, a second one of the non-speech channels, and the speech channel, and the step of upmixing includes a step of generating the speech channel in response to the input signal including by summing the left channel with the right channel.

7. The method of claim 5, wherein step (a) includes a step of generating power ratios, including at least one ratio of power in a speech channel determined by the input signal to power in a non-speech channel determined by the input signal.

8. The method of claim 7, wherein step (a) also includes a step of shaping in nonlinear fashion and scaling at least one of the power ratios.

9. The method of claim 1, wherein the input signal is a multi-channel audio signal having more than two channels, and step (a) includes steps of:
   (c) downmixing the input signal to generate a downmixed stereo signal; and
   (d) analyzing the downmixed stereo signal to generate the filter control values.

10. The method of claim 9, wherein the dialog-enhanced speech channel and the attenuated non-speech channels generated in step (b) determine a dialog-enhanced multi-channel output signal.

11. The method of claim 9, wherein step (a) includes a step of generating power ratios, including at least one ratio of power in a speech channel determined by the input signal to power in a non-speech channel determined by the input signal.

12. The method of claim 11, wherein step (a) also includes a step of shaping in nonlinear fashion and scaling at least one of the power ratios.

13. The method of claim 1, wherein the analyzing is time domain analysis on samples of the input signal, the filtering is time domain filtering of samples of the speech channel, and the attenuating is time domain attenuation of samples of the non-speech channels.

14. A system for enhancing dialog determined by an audio input signal, including:
   an analysis subsystem coupled and configured to analyze the input signal to generate filter control values without use of feedback; and
   a filtering subsystem coupled to the analysis subsystem and including a peaking filter and ducking circuitry, wherein the peaking filter is coupled to receive at least one of the control values and configured to filter a speech channel determined by the input signal, while being steered by said at least one of the control values, to generate a dialog-enhanced speech channel, and the ducking circuitry is configured to attenuate non-speech channels determined by the input signal, while being steered by at least a subset of the control values, to generate attenuated non-speech channels, where the control values are distinct from the speech channel, the control values are distinct from the non-speech channels, the peaking filter is distinct from the ducking circuitry, the peaking filter is coupled and configured to filter the speech channel but not the non-speech channels, including by emphasizing frequency components of the speech channel in a frequency range critical to intelligibility of speech relative to frequency components of the speech channel outside the frequency range, where said frequency range has a center frequency, the ducking circuitry is coupled and configured to attenuate the non-speech channels but not the speech channel, including by reducing gain application to the non-speech channels in response to a change in said at least a subset of the control values indicative of an increase, within limits, in power of the speech channel relative to combined power of the non-speech channels, and the peaking filter is configured to apply increased gain to frequency components of the speech channel having the center frequency in response to a change in said at least one of the control values indicating an increase in power of the speech channel relative to power of at least one of the non-speech channels.

15. The system of claim 14, wherein the analysis subsystem is configured to generate power ratios in response to the input signal, the power ratios including at least one ratio of power in a speech channel determined by the input signal to power in a non-speech channel determined by the input signal.

16. The system of claim 15, wherein the analysis subsystem is configured to shape in nonlinear fashion and scale at least one of the power ratios.

17. The system of claim 15, wherein the analysis subsystem is configured to shape in nonlinear fashion at least one of the power ratios including by exponentiating at least one value determined from said at least one of the power ratios.

18. The system of claim 14, wherein the input signal is a stereo signal, and the filtering subsystem includes:
upmixing circuitry configured to upmix the input signal to generate a speech channel and non-speech channels; and
circuitry coupled and configured to analyze the speech channel and the non-speech channels to generate the filter control values.

19. The system of claim 14, wherein the input signal is a stereo signal having a left channel and a right channel, and the filtering subsystem includes:
upmixing circuitry configured to upmix the input signal to generate a speech channel by summing the left input channel and the right input channel, and non-speech channels by subtracting the speech channel from each of the left input channel and the right input channel; and
circuitry coupled and configured to analyze the speech channel and the non-speech channels to generate the filter control values.

20. The system of claim 14, wherein the input signal is a stereo signal and the filtering subsystem is configured to combine the dialog-enhanced speech channel and the attenuated non-speech channels to generate a dialog-enhanced stereo output signal.

21. The system of claim 20, wherein the analysis subsystem is configured to upmix the input signal to determine a first one of the non-speech channels, a second one of the non-speech channels, and the speech channel.

22. The system of claim 20, wherein the analysis subsystem is configured to generate power ratios in response to the input signal, the power ratios including at least one ratio of power in a speech channel determined by the input signal to power in a non-speech channel determined by the input signal.

23. The system of claim 22, wherein in the analysis subsystem is configured to shape in nonlinear fashion and scale at least one of the power ratios.

24. The system of claim 14, wherein the input signal is a multi-channel audio signal having more than two channels, the system is configured to downmix the input signal to generate a downmixed stereo signal, and the analysis subsystem is configured to analyze the downmixed stereo signal to generate the filter control values.

25. The system of claim 24, wherein the analysis subsystem is configured to downmix the input signal to generate the downmixed stereo signal, and the filtering subsystem is configured to assert the dialog-enhanced speech channel and the attenuated non-speech channels as a dialog-enhanced multi-channel output signal.

26. The system of claim 24, wherein the analysis subsystem is configured to generate power ratios in response to the input signal, the power ratios including at least one ratio of power in a speech channel of the input signal to power in a non-speech channel of the input signal.

27. The system of claim 26, wherein in the analysis subsystem is configured to shape in nonlinear fashion and scale at least one of the power ratios.

28. The system of claim 14, wherein the peaking filter is a biquadratic filter whose response is determined by a current value of each said at least one of the control values.

29. The system of claim 14, wherein said system is a data processing system configured to implement the analysis subsystem and the filtering subsystem.

30. The system of claim 14, wherein said system is an audio digital signal processor.

31. The system of claim 14, wherein said system is an audio digital signal processor including circuitry configured to implement the analysis subsystem and the filtering subsystem.

* * * * *